US012401201B2

(12) United States Patent
Ren et al.

(10) Patent No.: US 12,401,201 B2
(45) Date of Patent: Aug. 26, 2025

(54) SEAMLESS MODE CHANGE BETWEEN GRID-CONNECTED MODE AND ISLANDED MODE FOR PV SYSTEMS

(71) Applicant: Texas Tech University System, Lubbock, TX (US)

(72) Inventors: Beibei Ren, Lubbock, TX (US); Yeqin Wang, Lubbock, TX (US)

(73) Assignee: TEXAS TECH UNIVERSITY SYSTEM, Lubbock, TX (US)

( * ) Notice: Subject to any disclaimer, the term of this patent is extended or adjusted under 35 U.S.C. 154(b) by 25 days.

(21) Appl. No.: 18/564,560

(22) PCT Filed: May 27, 2022

(86) PCT No.: PCT/US2022/031422
§ 371 (c)(1),
(2) Date: Nov. 27, 2023

(87) PCT Pub. No.: WO2022/251689
PCT Pub. Date: Dec. 1, 2022

(65) Prior Publication Data
US 2024/0275175 A1    Aug. 15, 2024

Related U.S. Application Data

(60) Provisional application No. 63/194,004, filed on May 27, 2021.

(51) Int. Cl.
*H02J 3/38* (2006.01)
*H02M 1/00* (2007.01)

(52) U.S. Cl.
CPC .............. *H02J 3/381* (2013.01); *H02J 3/388* (2020.01); *H02M 1/0012* (2021.05); *H02M 1/007* (2021.05); *H02J 2300/26* (2020.01)

(58) Field of Classification Search
CPC .... H02J 3/38; H02J 3/381; H02J 3/388; H02J 2300/26; H02M 1/007; H02M 1/0012; H02M 1/00
See application file for complete search history.

(56) References Cited

U.S. PATENT DOCUMENTS

2020/0271348 A1    8/2020    Benefield

FOREIGN PATENT DOCUMENTS

| CN | 110556856 B | 3/2021 | |
| CN | 109038662 B | 5/2021 | |
| WO | WO-2017216575 A1 * | 12/2017 | ................ H02J 3/32 |

OTHER PUBLICATIONS

PCT/US2022/031422. International Search Report & Written Opinion (Dec. 2, 2022).

* cited by examiner

*Primary Examiner* — Robert L Deberadinis
(74) *Attorney, Agent, or Firm* — LOZA & LOZA, LLP; Kevin L. Soules

(57) ABSTRACT

A unified control scheme to achieve seamless mode change between grid-connected mode and islanded mode for photovoltaic (PV) systems includes two decoupled control units: a DC-DC converter control unit and a DC-AC converter control unit. The DC-bus voltage is controlled through the DC-DC converter control unit, which supplies a "stiff DC source" to the DC-AC converter. The seamless mode change is implemented in the DC-AC converter control module via three digital switches between power flow control for grid-connected mode (or MPPT mode), and droop control for islanded mode (or droop mode), while preserving the continuity of control signals in all control units with the configurations of digital switches.

17 Claims, 13 Drawing Sheets

SEAMLESS MODE CHANGE BETWEEN GRID-CONNECTED MODE AND ISLANDED MODE FOR PV SYSTEMS

CROSS REFERENCE TO RELATED PATENT APPLICATIONS

This patent application claims the priority and benefit, under 35 U.S.C. § 119(e), of U.S. Provisional Patent Application Ser. No. 63/194,004, filed May 27, 2021, and titled "SEAMLESS MODE CHANGE BETWEEN GRID-CONNECTED MODE AND ISLANDED MODE FOR PV SYSTEMS". U.S. Provisional Application Ser. No. 63/194,004 is incorporated herein by reference in its entirety.

TECHNICAL FIELD

Embodiments are generally related to the field of energy production. Embodiments are further related to the field of photovoltaics. Embodiments are also related to methods, systems, and devices for grid-connected photovoltaic systems. Embodiments are related to methods, systems, and devices for islanded photovoltaic systems. Embodiments are further related to methods, systems, and devices for seamless mode change between grid-connected mode and islanded mode for photovoltaic systems.

BACKGROUND

Photovoltaics (PV) are a promising solar technology that convert sunlight into electricity. PV enjoys broad applicability in the energy industry. Typical grid-integration PV systems use dual-stage power processing converters that include a DC-DC converter and a DC-AC converter, connected in series via a DC-voltage bus. In typical grid-integration PV systems, certain control aspects (e.g., power tracking algorithms) are integrated in the DC-DC converter control, while the DC-bus voltage is controlled through the design of the DC-AC converter control.

For example, in some cases, a proportional-integral (PI) control is used for regulation of DC-bus voltage, to form a virtual current reference. The current control is adopted for AC grid integration of the DC-AC converter. This control framework works for PV systems in grid-connected mode.

However, in addition to grid-connected mode, PV systems should also be designed to operate in islanded mode. For example, the PV source and the utility grid can work together to support some local loads, and the extra solar energy can be sent to the utility grid in grid-connected mode. If the utility grid is suddenly lost, the PV source still can support the local loads in islanded mode.

The microgrid system will play a very important role in the future of the energy industry, and has received increasing attention in recent years. Specifically, it would be advantageous for PV systems to operate with microgrids and to incorporate functionality allowing both grid-connected mode and islanded mode.

The operation of islanded mode is very important for distributed renewable generators, including solar power, particularly in microgrid applications. If the microgrids do not have energy storage devices (e.g., PV/diesel-generator microgrids, PV/fuel-cell microgrids, etc.), the energy storage devices are full, or the storage devices cannot store more renewable power, the distributed renewable generators need to operate in islanded mode to avoid the increase of both voltage and frequency.

As a result, mode change between grid-connected mode and islanded mode is critical for grid-integration PV systems. Some research has focused on mode change of PV systems with a single-stage converter. However, in these studies the DC input voltage (the same as the PV output voltage) of the DC-AC converter cannot maintain a constant level, which affects its ability to reliably integrate with the electrical grid.

As for grid-integration PV systems with dual-stage converters, it is a continuing challenge to design a system that properly changes operational modes because, in prior art control systems, the tracking is handled by the DC-DC converter control in grid-connected operation, and requires that the same amount of real power generated by PV sources be fed into the grid through the DC-AC converter control, in order to guarantee system stability. In this way, the DC-DC converter control and DC-AC converter control are coupled with each other. Therefore, the DC-AC converter cannot be dispatched with droop control in islanded mode directly.

It would be useful to have an extra configuration to facilitate mode change where the whole control system should be switched between two different control configurations. However, solving this problem has proved to be a challenge. Specifically, attempts to address this issue have resulted in extreme complexity in both DC-DC converter control and DC-AC converter control, along with complex procedures necessary to achieve mode change.

Furthermore, using prior art control strategies it is very difficult to simultaneously conduct both the DC-DC converter control and the DC-AC converter control to achieve mode switching. The complex procedures and simultaneous change requirement in those control strategies make it challenging to achieve seamless mode change for grid-integration PV systems and guarantee transient switching performances.

Accordingly, there is a need in the art for a unified control framework for photovoltaic systems that provides simple, seamless mode change between grid-connected mode and islanded mode as disclosed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method, system, and apparatus for energy generation.

It is another aspect of the disclosed embodiments to provide a method and system for photovoltaic energy generation.

It is another aspect of the disclosed embodiments to provide grid integration for photovoltaic systems.

It is another aspect of the disclosed embodiments to achieve seamless mode change between grid-connected mode and islanded mode for photovoltaic systems.

The aforementioned aspects and embodiments can be achieved as described herein. In an embodiment, a unified control framework for photovoltaic (PV) systems is disclosed that provides seamless mode change between grid-connected mode and islanded mode. Different from prior art control systems, in this unified control framework, the regulation of DC-bus voltage is embedded into the DC-DC converter control, and the seamless mode change is implemented in the DC-AC converter control. In this way, the DC-DC converter control and the DC-AC converter control are completely decoupled with each other. Through the DC-bus voltage control for the output voltage regulation of the DC-DC converter, a "stiff DC source" is supplied to the DC-AC converter. Then the switching between power flow control in grid-connected mode and droop control in islanded mode is implemented in the DC-AC converter control to facilitate seamless mode change. The power flow control is combined with a maximum power point tracking (MPPT) algorithm to achieve maximum power acquisition in grid-connected mode. As a result, seamless mode change in this unified control framework is achieved through three digital switches.

In an embodiment a control system, comprises a PV system and a unified control framework that provides mode change between a grid-connected mode and an islanded mode. The PV system further comprises a PV collector, a DC-DC converter, and a DC-AC converter with an AC grid integration. In an embodiment the unified control framework further comprises a DC-DC converter control and a DC-AC converter control. The DC-DC converter control further comprises a voltage sensor that measures a DC-bus voltage associated with said PV system, a DC-bus voltage control unit that regulates said DC-bus voltage and forms a duty-cycle control signal, and a PWM generation unit that generates PWMs for said DC-DC converter from said duty-cycle control signal. The DC-AC converter control further comprises at least one sensor that measures a PV output voltage, at least one sensor that measures an AC grid voltage, and at least one sensor that measures an output current of a DC-AC converter. In an embodiment the DC-AC converter control further comprises a maximum power point tracking (MPPT) unit that maximizes a power acquisition of said PV system in grid-connected mode, a real power control unit that regulates a real power and forms a control signal from a derivative of a power angle in grid-connected mode, a PV voltage regulation unit that provides a linkage between said MPPT unit and said real power control unit, and a reactive power control unit that regulates a reactive power and forms a control signal from a derivative of output voltage. In an embodiment the DC-AC converter control further comprises a P&Q calculation unit that calculates said real power and said reactive power. The DC-AC converter control further comprises a P/ω droop unit that provides a frequency regulation for an AC grid and real power sharing in islanded mode and a Q/E droop unit that provides a voltage regulation for said AC grid and reactive power sharing in islanded mode. In an embodiment the DC-AC converter control further comprises a mode detection unit that detects an operation mode of an AC grid, three digital switch signals generated by said mode detection unit, and three digital switches configured to switch the mode of said PV system. In an embodiment the DC-AC converter control further comprises a voltage-forming unit that forms a sinusoidal control voltage according to a derivative of power angle and a derivative of output voltage. The DC-DC converter control and said DC-AC converter control are decoupled. In an embodiment the unified control framework is configured for natural DC-bus voltage protection, and a fault ride-through performance of said PV system is enhanced by DC-bus voltage protection. The mode change is implemented in said DC-AC converter control. In an embodiment, the unified control framework preserves the continuity of control signals in all control units with the configurations of digital switches.

In another embodiment a system, comprises a DC-DC converter control comprising: a voltage sensor configured to measure a DC-bus voltage associated with an external system, a DC-bus voltage control unit that regulates said DC-bus voltage and forms a duty-cycle control signal; a PWM generation unit that generates PWMs for said DC-DC converter from said duty-cycle control signal; and a DC-AC converter control comprising at least one sensor that measures an output voltage, at least one sensor that measures an AC grid voltage, and at least one sensor that measures an output current of a DC-AC converter. The DC-AC converter control further comprises a maximum power point tracking (MPPT) unit that maximizes a power acquisition in grid-connected mode, a real power control unit that regulates a real power and forms a control signal from a derivative of a power angle in grid-connected mode PV voltage regulation unit that provides a linkage between said MPPT unit and said real power control unit, and a reactive power control unit that regulates a reactive power and forms a control signal from a derivative of output voltage. The DC-AC converter control further comprises a P&Q calculation unit that calculates said real power and said reactive power, a P/ω droop unit that provides a frequency regulation for an AC grid and real power sharing in islanded mode, and a Q/E droop unit that provides a voltage regulation for said AC grid and reactive power sharing in islanded mode. In an embodiment, the DC-AC converter control further comprises three digital switch signals generated by a mode detection unit and three digital switches configured to switch the mode of said PV system.

In another embodiment a control apparatus, comprises a DC-DC converter, a DC-AC converter with an AC grid integration, a voltage sensor that measures a DC-bus voltage associated with said PV system, a DC-bus voltage control unit that regulates said DC-bus voltage and forms a duty-cycle control signal, a PWM generation unit that generates PWMs for said DC-DC converter from said duty-cycle control signal, at least one sensor that measures a PV output voltage, at least one sensor that measures an AC grid voltage, and at least one sensor that measures an output current of a DC-AC converter. In an embodiment, the mode change is implemented in said DC-AC converter control, and preserves the continuity of control signals in all control units with the configurations of digital switches.

It will be appreciated that variations of the above-disclosed and other features and functions, or alternatives thereof, may be desirably combined into many other different systems or applications. Also, it should be understood that various presently unforeseen or unanticipated alternatives, modifications, variations, or improvements therein may be subsequently made by those skilled in the art which are also intended to be encompassed by the following claims.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
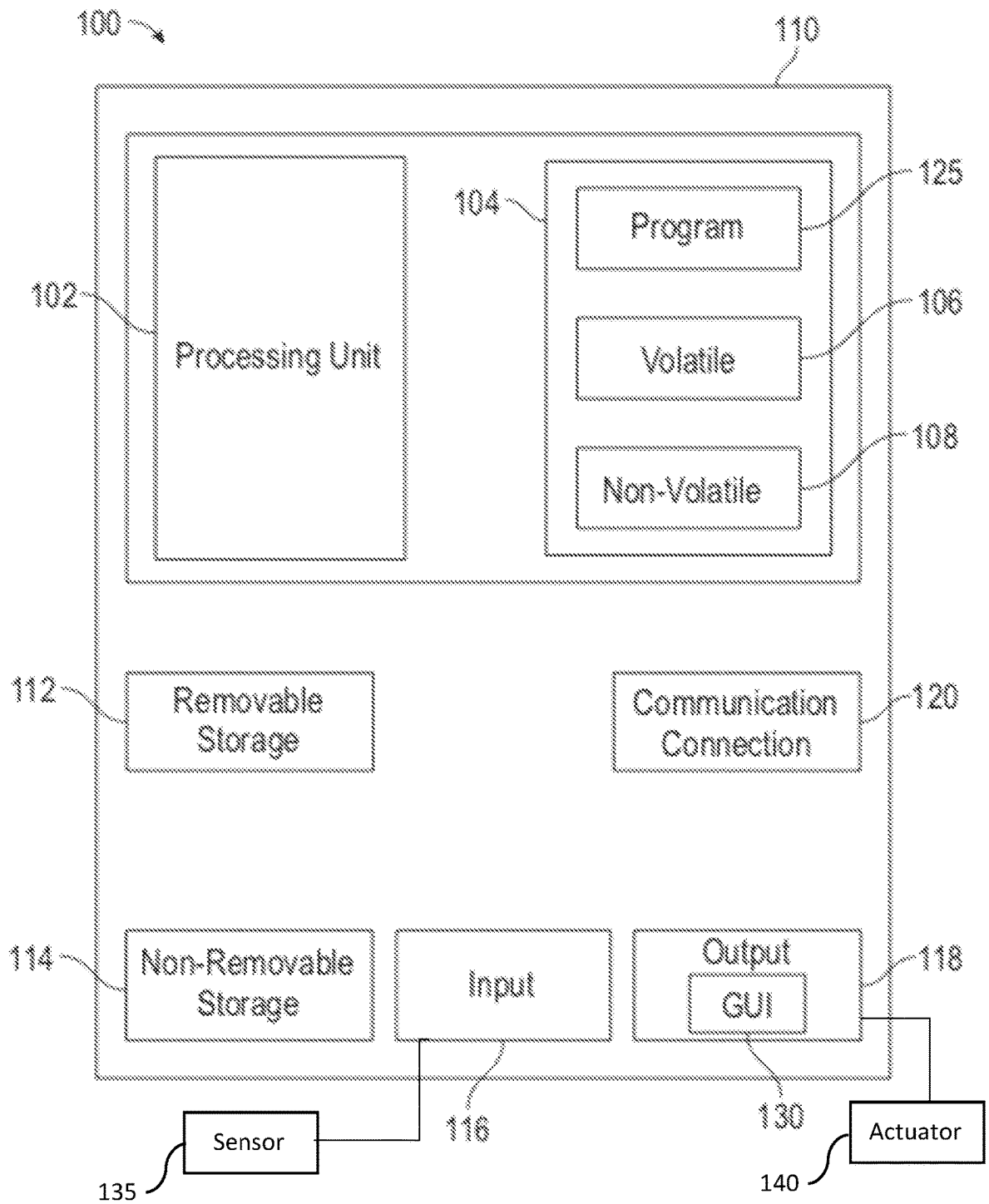
FIG. 1 depicts a block diagram of a computer system which is implemented in accordance with the disclosed embodiments.

The particular values and configurations discussed in the following non-limiting examples can be varied and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope and concept of the invention as defined by the appended claims.

Figure 2:
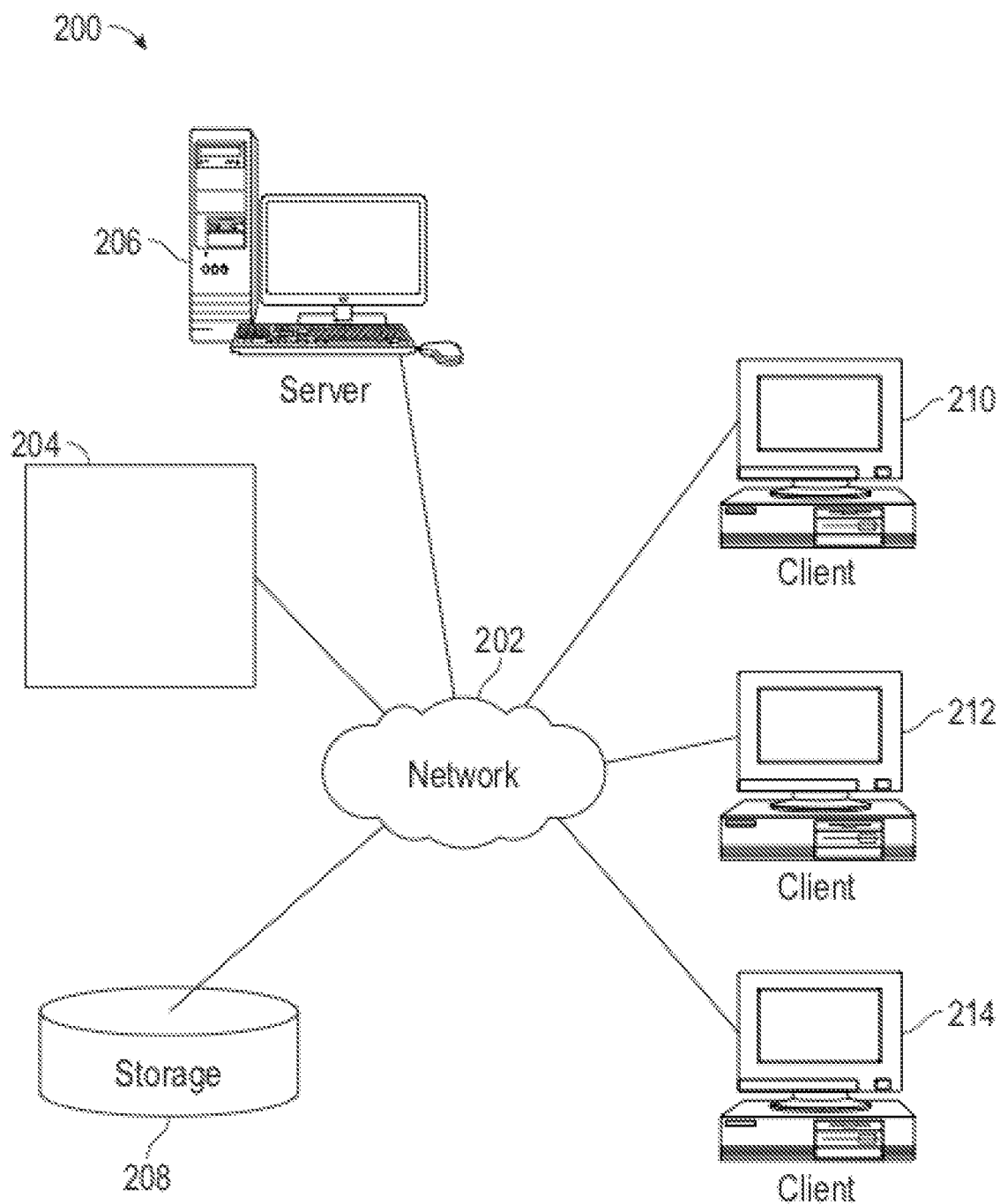
FIG. 2 depicts a graphical representation of a network of data-processing devices in which aspects of the present embodiments may be implemented.
Figure 3:
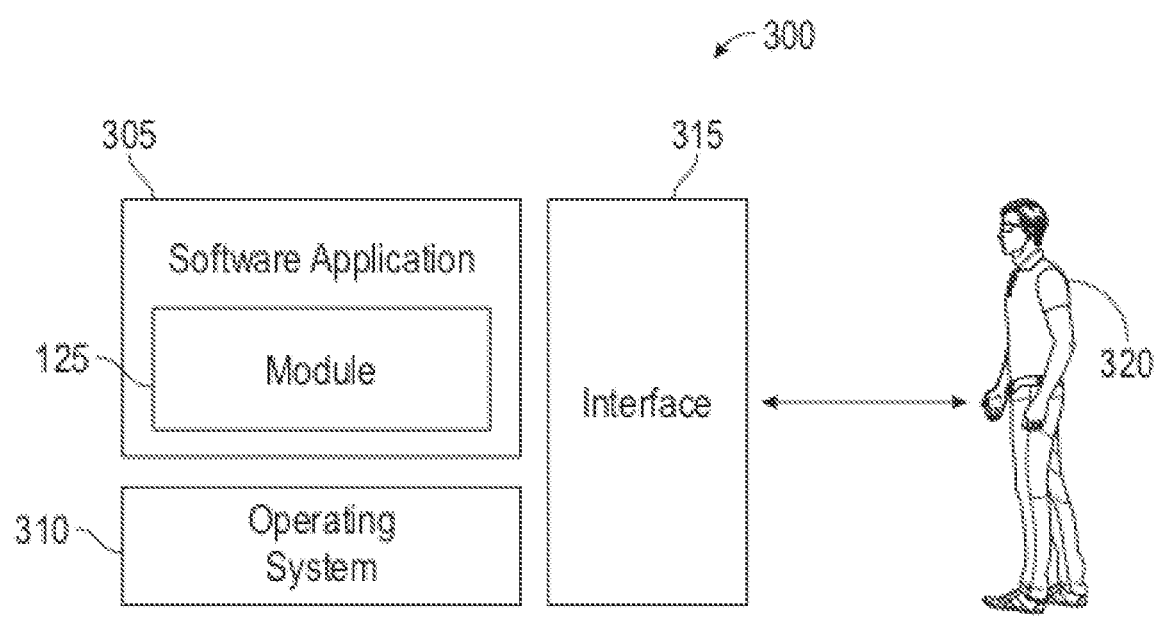
FIG. 3 depicts a computer software system for directing the operation of the data-processing system depicted in FIG. 1, in accordance with an embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that can serve as a control device that executes programming for implementing parts of the methods and systems disclosed herein is shown in FIG. 1. A computing device in the form of a computer 110 configured to interface with controllers, peripheral devices, and other elements disclosed herein may include one or more processing units 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 110 may include, or have access to, a computing environment that includes input 116, output 118, and a communication connection 120. The computer may operate in a networked environment using a communication connection 120 to connect to one or more remote computers, remote sensors and/or controllers, detection devices, handheld devices, multi-function devices (MFDs), speakers, mobile devices, tablet devices, mobile phones, Smartphone, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth connection, or other networks. This functionality is described more fully in the description associated with FIG. 2 below.

Output 118 is most commonly provided as a computer monitor, but may include any output device. Output 118 and/or input 116 may include a data collection apparatus associated with control device 100. In addition, input 116, which commonly includes sensor signals from control targets 135, e.g., voltages, currents, etc. from electrical systems, but may also include a computer keyboard and/or pointing device such as a computer mouse, computer track pad, or the like, allows a user to select and instruct control device 100. Output 118 commonly includes the control signals acted on actuators 140, e.g., Pulse Width Modulation (PWM) signals for powering electronic devices in electrical systems, but also may include a display for displaying data and information for a user. A user interface can be provided using output 118 and input 116 for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, are stored on a computer-readable medium and are executable by the processing unit 102 of computer control device 110. Program module or node 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 can be a network of computers or other such devices, such as mobile phones, smart phones, sensors, controllers, speakers, tactile devices, and the like, in which embodiments of the present invention may be implemented. Note that the system 200 can be implemented in the context of a software module such as program module 125. The system 200 includes a network 202 in communication with one or more clients 210, 212, and 214. Network 202 may also be in communication with one or more devices 204, servers 206, and storage 208. Network 202 is a medium that can be used to provide communications links between various devices and computers connected together within a networked data processing system such as control device 100. Network 202 may include connections such as wired communication links, wireless communication links of various types, and fiber optic cables. Network 202 can communicate with one or more servers 206, one or more external devices such as device 204, and a memory storage unit such as, for example, memory or database 208. It should be understood that device 204 may be embodied as a PV system, or subcomponent of a PV system as disclosed herein.

In the depicted example, device 204, server 206, and clients 210, 212, and 214 connect to network 202 along with storage unit 208. Clients 210, 212, and 214 may be, for example, personal computers or network computers, hand-held devices, mobile devices, tablet devices, smart phones, personal digital assistants, printing devices, recording devices, speakers, MFDs, etc. Computer system 100 depicted in FIG. 1 can be, for example, device 204 may be embodied as a PV system, or a client such as client 210 and/or 212 and/or 214.

Computer system 100 can also be implemented as a server such as server 206, depending upon design considerations. In the depicted example, server 206 provides data such as boot files, operating system images, applications, and application updates to clients 210, 212, and/or 214. Clients 210, 212, and 214 and device 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet, with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which may be employed for directing the operation of the data-processing systems such as control device 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 114 into the memory 104) for execution by the data-processing system 100. The data-processing system 100 can receive user commands and data through user interface 315, which can include input 116 and output 118, accessible by a user 320. These inputs may then be acted upon by the control device or computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smart phones, tablet devices multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the term "module" or "node" as utilized herein may refer to a collection of routines and data structures that perform a particular task or implements a particular abstract data type. Modules may be composed of two parts: an interface, which lists the constants, data types, variables, and routines that can be accessed by other modules or routines; and an implementation, which is typically private (accessible only to that module), and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of, or require the use of, a data-processing system such as control device 100, in conjunction with program module 125, and data-processing system 200 and network 202 depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, advanced RISC machine (ARM), digital signal processor (DSP), Arduino and the like. Therefore, the descriptions of the exemplary embodiments, which follow, are for purposes of illustration and not considered a limitation.

The embodiments disclosed herein present a unified control framework for photovoltaic (PV) systems to achieve seamless mode change between grid-connected mode and islanded mode. Different from traditional designs, in this unified control framework, the regulation of DC-bus voltage is embedded into the DC-DC converter control, and the seamless mode change is implemented in the DC-AC converter control. In this way, the DC-DC converter control and the DC-AC converter control can be completely decoupled from each other. Through the DC-bus voltage control for the output voltage regulation of the DC-DC converter, a "stiff DC source" is supplied to the DC-AC converter. Then the switching between power flow control in grid-connected mode and droop control in islanded mode is implemented in the DC-AC converter control to facilitate seamless mode change. The power flow control is combined with a maximum power point tracking (MPPT) algorithm to achieve maximum power acquisition in grid-connected mode. As a result, seamless mode change in this unified control framework can be provided through three digital switches.

Figure 4:
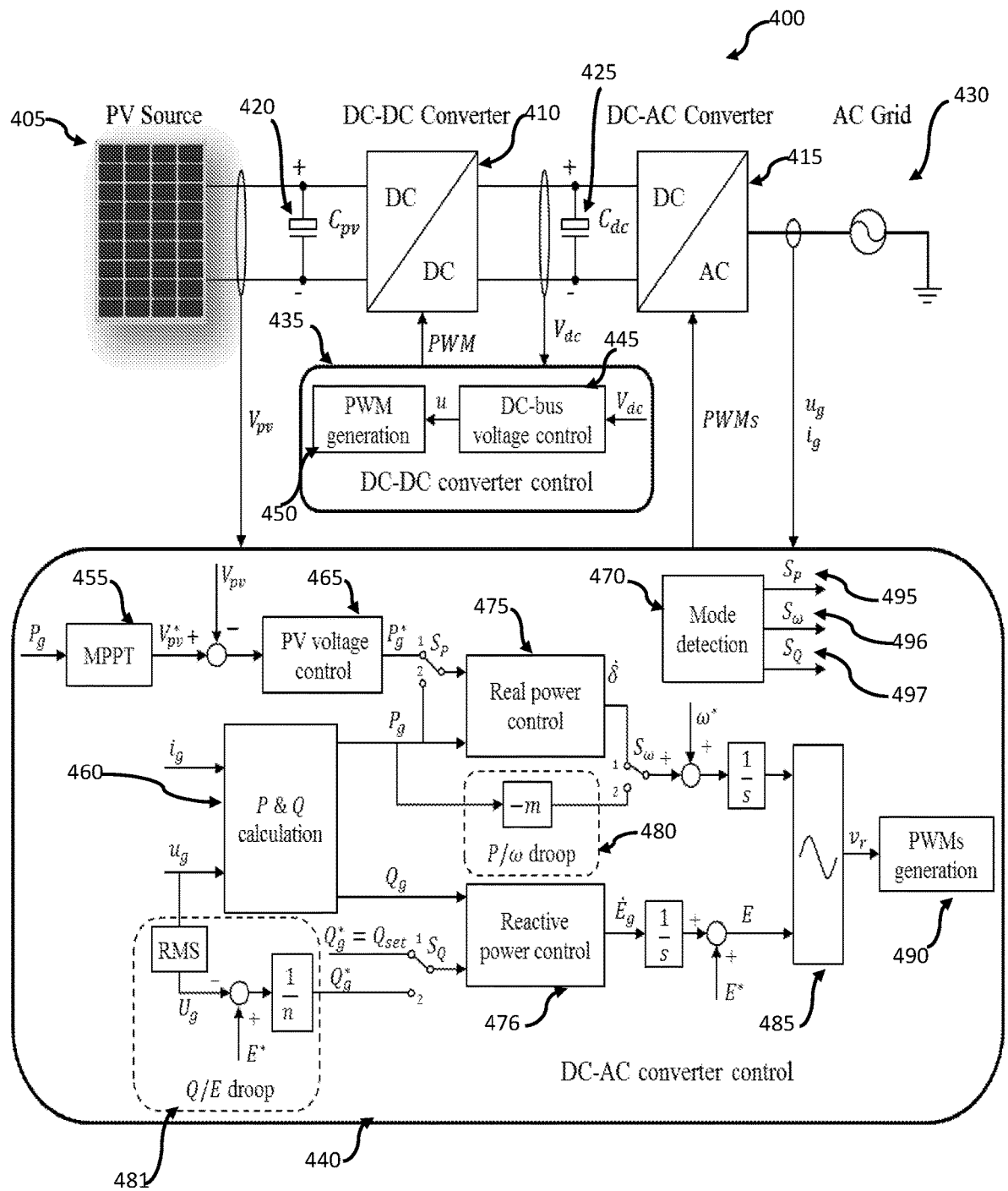
FIG. 4 depicts a grid-integration PV system, in accordance with a preferred embodiment.

FIG. 4, illustrates a grid-integration PV system 400 with dual-stage converters in accordance with the disclosed embodiments. The system 400 includes a PV source 405 (e.g., photovoltaic solar panels), a DC-DC converter 410 and a DC-AC converter 415. The PV source 405 and the DC-DC converter 410 are connected in series with a capacitor $C_{pv}$ 420 to stabilize the PV output voltage. The DC-DC converter 410 and the DC-AC converter 415 are connected in series with another capacitor $C_{dc}$ or a DC-bus 425, to smooth the DC-bus voltage. The AC grid 430 can be the utility grid or the microgrid. The system 400 and associated methods disclosed herein provide a unified control framework that allows seamless mode change.

The unified control system 400, illustrated in FIG. 4, includes two decoupled modules: the DC-DC converter control 435 and the DC-AC converter control 440. The DC-DC converter control 435 includes a DC-bus voltage control unit 445 and a pulse width modulation (PWM) generation unit 450. Through the DC-bus voltage control 445, the variable-voltage DC power directly generated from the PV source 405 is converted to the constant-voltage DC-bus 425. The PWM generation unit 450 transfers the duty-cycle output of the DC-bus voltage control unit 445 into the final PWM control signal for the DC-DC converter 410.

The DC-AC converter control 440 includes a maximum power point tracking (MPPT) unit 455, a P&Q calculation unit 460, a PV voltage control unit 465, a mode detection unit 470, two power flow control units (including real power control 475 and reactive power control 476), two droop control units (including P/ω droop control unit 480 and Q/E droop control unit 481), a sinusoidal voltage-forming unit 485, and a PWMs generation unit 490.

The P&Q calculation unit 460 is adopted to calculate both real power output $P_g$ and reactive power output $Q_g$ of the DC-AC converter 415. The real power output $P_g$ will be maximized through the MPPT unit 455, and the power flow control units (i.e., real power control 475 and reactive power control 476) convert DC power from the DC-bus 425 into AC grid 430 in grid-connected mode. The PV voltage control unit 465 is configured to bridge the MPPT unit 455 and the real power control 475.

The mode detection unit 470 is used for detecting the grid operation conditions. Note that, in certain embodiments, the mode detection unit 470 could be embodied as external trigger signals, e.g., from a microgrid centralized controller (MGCC). The droop control units 480 and 481 provide frequency regulation, voltage regulation, and power sharing in islanded mode. Three digital switches $S_P$ 495, $S_W$ 496, and $S_Q$ 497 associated with mode detection unit 470, are used to change the operation modes of the PV system 400. The sinusoidal voltage-forming unit 485 combines the amplitude and frequency of the control voltage, and the PWMs generation unit 490 generates the final PWMs control signals for the DC-AC converter 415.

In the unified control system 400, the regulation of the DC-bus voltage is implemented in the DC-DC converter control 435, and the mode change is integrated in the DC-AC converter control 440, as shown in FIG. 4. In an embodiment, the DC-DC converter control 435 and the DC-AC converter control 440 are decoupled. Thus, the DC-bus voltage regulation will be always guaranteed, and is not affected by the behaviors in the DC-AC converter control 440 (e.g., mode change). The unified control system 400 naturally provides the DC-bus voltage protection, even in the event of fault conditions in the DC/AC converter 415 or AC grid side 430. Through the DC-bus voltage control 445 in the DC-DC converter control 435, a "stiff DC source" can be reliably supplied to the DC-AC converter 415. Therefore, seamless mode change can be achieved in the DC-AC converter control 440. Also, the fault ride-through performance of the whole system 400 is enhanced by DC-bus voltage protection.

The three switches $S_P$ 495, $S_W$ 496, and $S_Q$ 497 offer further advantages associated with the system 400. The seamless mode change in the DC-AC converter control 440 for the system 400 is achieved via operating switches $S_P$ 495, $S_W$ 496, and $S_Q$ 497.

Two operation modes are illustrated in Table 1.

TABLE 1

| OPERATION MODES OF GRID-INTEGRATION PV SYSTEMS | | | |
|---|---|---|---|
| Switch $S_P$ | Switch $S_W$ | Switch $S_Q$ | Mode |
| 1 | 1 | 1 | Grid-connected mode |
| 2 | 2 | 2 | Islanded mode |

When the switches $S_P$ 495, $S_W$ 496, and $S_Q$ 497 switch to position 1, as shown in Table 1, the system 400 operates in grid-connected mode. The DC-AC converter control 440 includes four basic steps: MPPT 455, PV voltage control 465, power flow control of both real power 475 and reactive power 476, and sinusoidal control voltage generation 485. Here, MPPT 455, which can be embodied as a P&O algorithm, is focused on the output power $P_g$ to achieve a maximum system output.

The perturbation signal of MPPT 455 cannot be added on the real power reference $P^*_g$ directly, because the positive perturbation of $P^*_g$ at the maximum point might cause system instability. The PV voltage control unit 465 can be used to mitigate this effect. The reactive power reference $Q^*_g$ is usually set to zero with $Q_{set}$=0 to keep the unity power factor in grid-connected mode. The sinusoidal control voltage $v_r$ is generated according to the derivatives of both power angle and output voltage passing through the integration units and combining with the global settings.

When the switches $S_P$ 495, $S_W$ 496, and $S_Q$ 497 switch to position 2 shown in Table 1, the system 400 operates at islanded mode with droop control. The P/ω droop unit 480 provides frequency regulation in the real power channel. The Q/E droop unit 481 generates the reactive power reference $Q^*_g$, which combines with the reactive power control 476 to provide voltage regulation in the reactive power channel. Accordingly, the power sharing of both real power and reactive power can be guaranteed.

In this unified control framework, only three switches $S_P$ 495, $S_W$ 496, and $S_Q$ 497, are necessary in the DC-AC converter control 440 for mode change between grid-connected mode and islanded mode. It is worth noting that the major function of switch $S_P$ 495 is to preserve the continuity of the real power control unit 475 in islanded mode. If $S_P$ 495 switches to position 2, it can prevent the signal δ from reaching infinity even in the presence of the mismatched real power reference $P^*_g$ and real power input $P_g$ in islanded mode. $S_P$ 495 is also used to enable/disable both MPPT unit 455 and PV voltage control unit 465 in different modes.

The switches $S_W$ 496 and $S_Q$ 497 provide mode changes. In this way, the unified control framework achieves seamless mode change for PV systems. It is noteworthy that this unified control framework has a simple design and does not require any reconfiguration of the control systems. As a result, a simpler procedure is enabled by the operation of switches $S_P$ 495, $S_W$ 496, and $S_Q$ 497.

Though all control units in the proposed control system 400 in FIG. 4 can be implemented using any number of algorithms, the framework itself, especially, the DC-bus voltage control 445 in the DC-DC converter control 435, and mode change in the DC-AC converter control 440, are of particular note. The detailed control algorithms for the unified control framework to facilitate seamless mode change are incorporated as embodiments disclosed herein.

Figure 5:
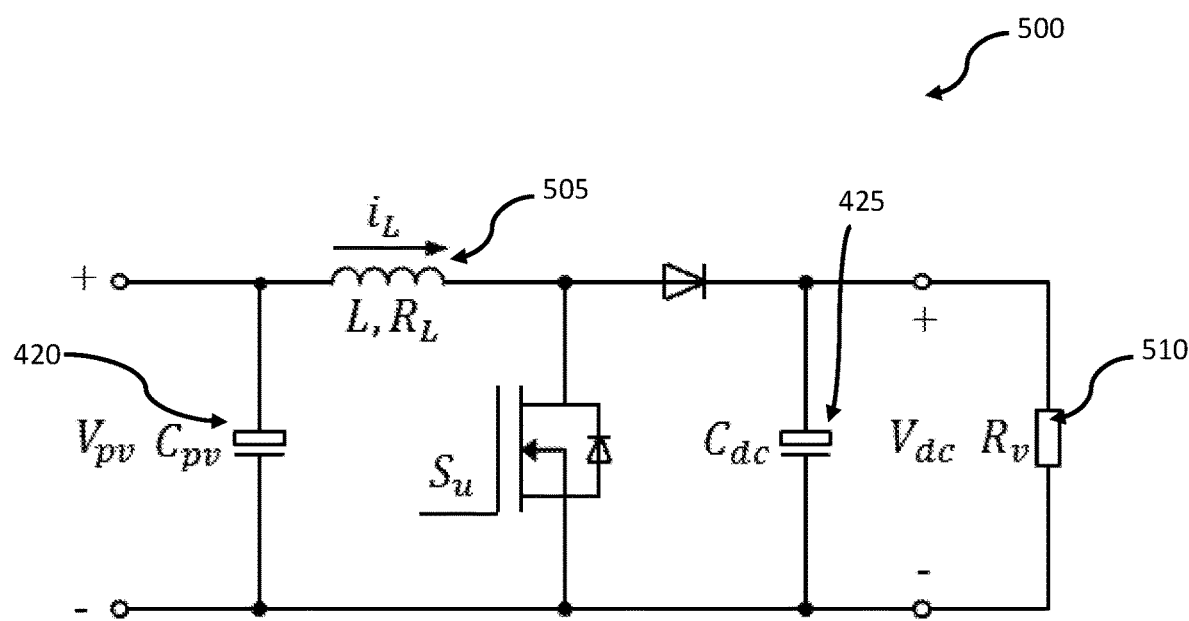
FIG. 5 depicts a boost converter, in accordance with an embodiment.

With respect to DC-bus voltage control, in certain grid-integration PV systems, a DC-DC boost converter can be used. FIG. 5 illustrates a boost converter 500 in accordance with an embodiment. It should be understood that in certain embodiments other types of DC-DC converters can be applied according to design consideration. The model of the boost converter without parasitics is represented according to equations (1) and (2) as follows:

$$\dot{V}_{dc} = (1-u)\frac{i_L}{C_{dc}} - \frac{V_{dc}}{C_{dc}R_v} \quad (1)$$

$$\dot{i}_L = -(1-u)\frac{V_{dc}}{L} + \frac{V_{pv}}{L} - \frac{R_L}{L}i_L \quad (2)$$

where $V_{pv}$ is the input voltage, which is connected to the output of the PV source 405; $V_{dc}$ is the output voltage, which is connected to the input of the DC-AC converter 415; $i_L$ is the current of the inductor 505; L is the inductor 505 inductance and $R_L$ is the inductor 505 resistance; $C_{pv}$ 420 is the capacitance of the input capacitor and $C_{dc}$ 425 is the output capacitance; $R_v$ is the virtual output resistance 510 to represent the load to feed the DC-AC converter 415, and $R_v$ changes according to different power consumptions of the DC-AC converter 415; u is the input within the range of 0-100%.

For the DC-bus voltage control of the DC-DC boost converter 500, many robust control designs based on the dynamics of equations (1) and (2) can be adopted. For example, in an embodiment, a PI controller, plus feedforward terms, as shown in equation (3) can be adopted:

$$u = 1 - \frac{V_{pv}}{V^*_{dc}} + K_{pdc}(V^*_{dc} - V_{dc}) + K_{idc}\int(V^*_{dc} - V_{dc})dt \quad (3)$$

where $V^*_{dc}$ is a DC-bus voltage reference, and $K_{pdc}>0$ and $K_{idc}>0$ are PI control gains.

Figure 6:
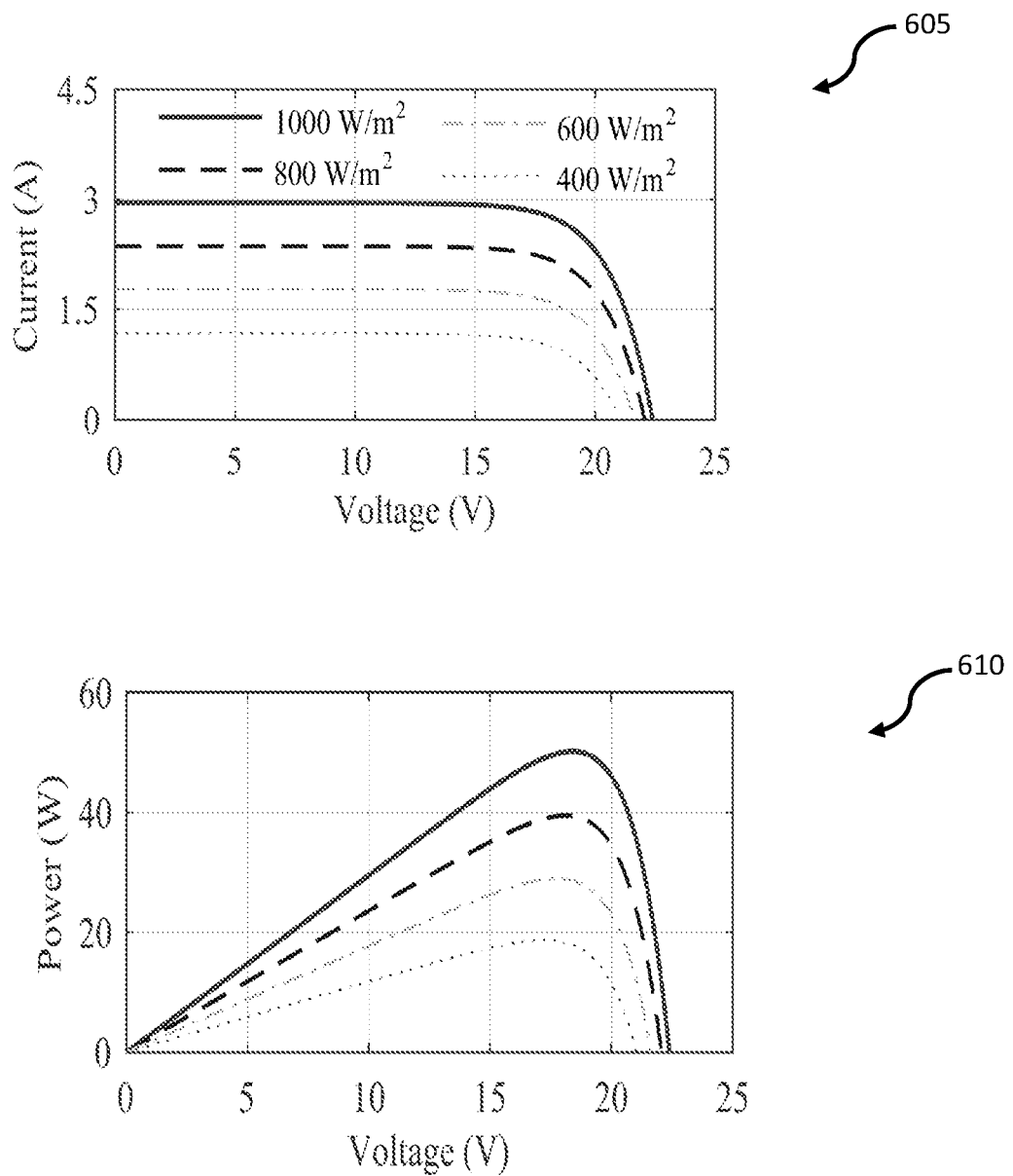
FIG. 6 depicts charts of power and current as a function of voltage, in accordance with the disclosed embodiments.

The PV output power and output current vary greatly with different loads and different sunlight conditions. According to a widely used five-parameter PV model, the $i_{pv}$-$V_{pv}$ and $P_{pv}$-$V_{pv}$ fitting curves for a commercial solar panel, 50 W RENOGY RNG-50P at a standard test temperature T=25° C. are shown in FIG. 6 at different sunlight irradiation levels. The current output and the power output under different sunlight irradiation levels and different output voltages (or load conditions) are illustrated in chart 605 and chart 610, respectively.

It is noteworthy that the PV source 405 will have many operating points, according to different loads under different environmental conditions. Thus, an optimal tool is required to get maximum power output of PV systems. In certain embodiments, the gradient-based extremum seeking (ES) algorithm can be used to maximize the real power output $P_g$ of grid-integration PV system 400 for the disclosed unified control framework.

Figure 7:
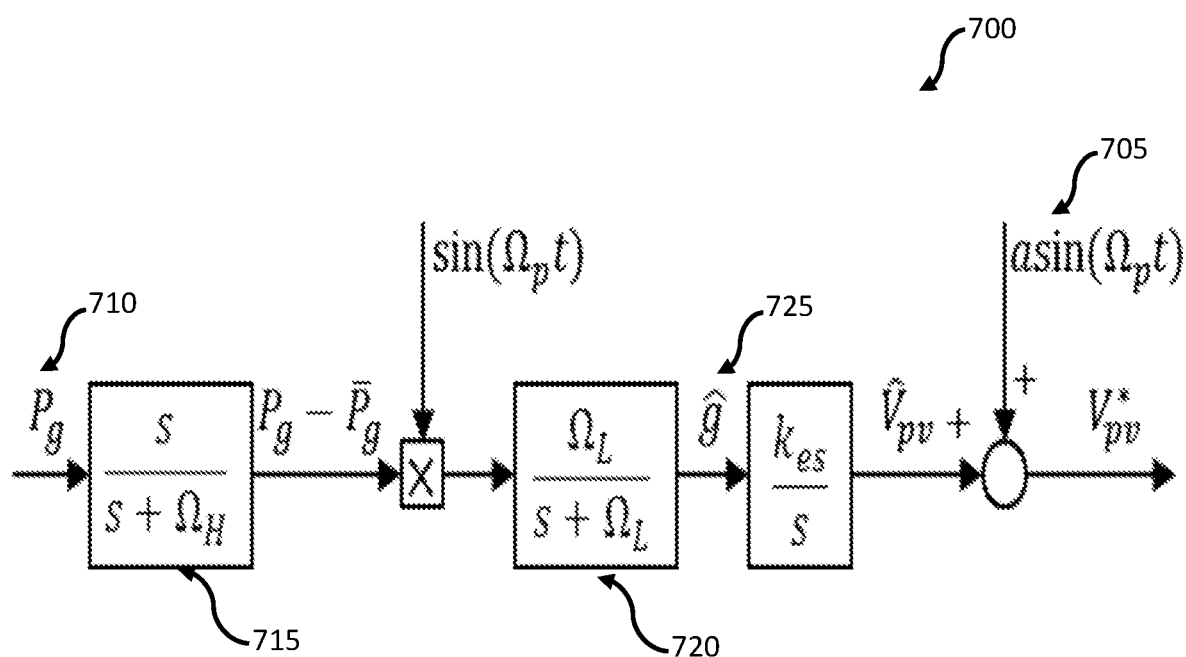
FIG. 7 depicts an extremum seeking (ES) method, in accordance with the disclosed embodiments.

An evolution strategy (ES) method 700 is illustrated in FIG. 7. In the embodiment, the perturbation signal 705 $\alpha \sin(\Omega_p t)$ is injected, for the observation of $\hat{g}$ 725 to achieve the maximum power output 710 $P_g$, where $$\frac{s}{s+\Omega_H}$$

is a high-pass filter 715 to filter the DC part of $P_g$, $$\frac{\Omega_L}{s+\Omega_L}$$

is a low-pass filter 720 to filter the double frequency of the perturbation signal, and $K_{es}>0$ is the integral or incremental gain for $\hat{g}$.

The PV voltage control unit 465 (shown in FIG. 4) can be designed with a PI controller, which can be characterized by equation (4):

$$P^*_g = -K_{ppv}(V^*_{pv} - V_{pv}) - K_{ipv}\int(V^*_{pv} - V_{pv})dt \quad (4)$$

where $V^*_{pv}$ is from the MPPT unit 455, and $K_{ppv}>0$ and $K_{ipv}>0$ are PI gains. Note that the PI controller for the PV voltage control 465 has negative gains. These negative gains are caused by the negative slope of $P_{pv}$-$V_{pv}$ curves of the solar panel from the open circuit point to the maximum power output point (as illustrated in chart 610 of FIG. 6).

Figure 8:
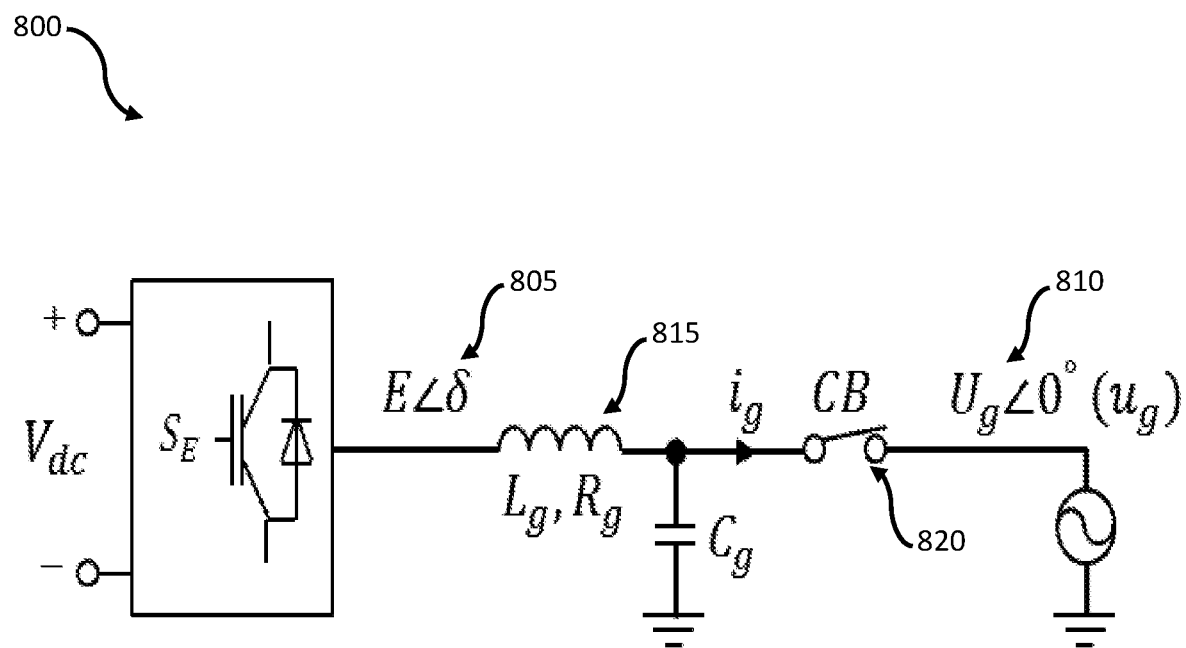
FIG. 8 depicts an electric circuit of a DC-AC converter, in accordance with the disclosed embodiments.

Power flow control is also necessary. FIG. 8 illustrates an embodiment of the electric circuit 800 of a DC-AC converter 415, where the power delivered from converter side E∠δ 805 to AC grid $U_g$∠0° 810 is calculated according to equations (5) and (6):

$$P_g = \left(\frac{E_g U_g}{Z_g}\cos\delta - \frac{U_g^2}{Z_g}\right)\cos\theta + \frac{E_g U_g}{Z_g}\sin\delta\sin\theta \quad (5)$$

$$Q_g = \left(\frac{E_g U_g}{Z_g}\cos\delta - \frac{U_g^2}{Z_g}\right)\sin\theta - \frac{E_g U_g}{Z_g}\sin\delta\cos\theta \quad (6)$$

In equations (5) and (6), $P_g$ is real power, $Q_g$ is reactive power, and $\delta$ is power angle; output impedance is represented as shown in equation (7)

$$Z_g \angle \theta = R_g + X_g j \qquad (7)$$

In equation (7), $X_g$ is determined primarily by inductor 815 $L_g$, because $C_g$ usually can be neglected; CB is an internal circuit breaker 820 for the DC-AC converter 415.

By taking derivatives of equations (5) and (6), the dynamics of power delivery can be obtained as shown in equations (8) and (9):

$$\dot{P}_g = \frac{E_g U_g}{Z_g} \dot{\delta} + \Delta_p \qquad (8)$$

$$\dot{Q}_g = \frac{U_g}{Z_g} \dot{E}_g + \Delta_q \qquad (9)$$

where $\Delta_p$ and $\Delta_q$ are given in equations (10) and (11) as follows:

$$\Delta_p = \frac{E_g U_g \dot{\delta}}{Z_g}(\cos\delta \sin\theta - 1) - \qquad (10)$$
$$\frac{E_g U_g \dot{\delta}}{Z_g}\sin\delta\cos\theta + \frac{U_g \dot{E}_g}{Z_g}\cos\delta\cos\theta + \frac{U_g \dot{E}_g}{Z_g}\sin\delta\sin\theta$$

$$\Delta_q = \frac{U_g \dot{E}_g}{Z_g}(\cos\delta \sin\theta - 1) - \qquad (11)$$
$$\frac{U_g \dot{E}_g}{Z_g}\sin\delta\sin\theta - \frac{E_g U_g \dot{\delta}}{Z_g}\cos\delta\cos\theta - \frac{U_g \dot{E}_g}{Z_g}\sin\delta\cos\theta$$

$\Delta_p$ and $\Delta_q$ indicate lumped unknown terms, which include uncertainties, nonlinearities, and coupling effects of power angle $\delta$ and output impedance $Z_g \angle \theta$.

According to the robust control methods disclosed herein, an uncertainty and disturbance estimator (UDE)-based control, and the power flow control with both real power control and reactive power control can be given according to equations (12) and (13) as:

$$\delta = \frac{Z_g}{E_g U_g}\left[L^{-1}\left\{\frac{1}{1-G_{pf}(s)}\right\}*(\dot{P}_g^* + k_p e_p) - L^{-1}\left\{\frac{sG_{pf}(s)}{1-G_{pf}(s)}\right\}*P_g\right] \qquad (12)$$

$$E_g = \frac{Z_g}{U_g}\left[L^{-1}\left\{\frac{1}{1-G_{qf}(s)}\right\}*(\dot{Q}_g^* + k_q e_q) - L^{-1}\left\{\frac{sG_{qf}(s)}{1-G_{qf}(s)}\right\}*Q_g\right] \qquad (13)$$

In equations (12) and (13), $P^*_g$ is a real power reference, and $Q^*_g$ is a reactive power reference. In grid-connected mode, $P^*_g$ is from the PV voltage control unit 465, and $Q^*_g$ is usually set to zero with $Q_{set}=0$ to keep unity power factor. In islanded mode, $P^*_g$ is from real power $P_g$ to prevent the signal $\delta$ from reaching infinity, and $Q^*_g$ is from Q/E droop unit 481. $e_p = P^*_g - P_g$ and $e_q = Q^*_g - Q_g$ are tracking errors. $k_p > 0$ and $k_q > 0$ are error feedback gains for error dynamics equations, $\dot{e}_p = -k_p e_p$ and $\dot{e}_q = -k_q e_q$ in the UDE-based control. $G_{pf}(s)$ and $G_{qf}(s)$ are UDE filters to estimate the unknown terms $\Delta_p$ in equation (10) and $\Delta_q$ in equation (11).

The droop control is primarily used for islanded mode operation of renewable generation units, and droop control can be implemented as illustrated in FIG. 4. The frequency regulation with P/ω droop 480 can be designed according to equation (14) as:

$$\omega = \omega^* - mP_g \qquad (14)$$

In equation (14), m is the real power droop coefficient, and $\omega^* = 2\pi f^*$, and $f^*$ are the rated frequency. In the steady-state, all parallel units in an islanded microgrid should hold the same frequency $\omega$. When that is the case, $mP_g$ in the PV system 400 is equal to other parallel units, which guarantees the accurate sharing of real power from the PV system 400 with other parallel units.

For Q/E droop 481, the reactive power reference $Q^*_g$ is generated according to equation (15):

$$Q^*_g = \frac{E^* - U_g}{n} \qquad (15)$$

In equation (15), E* is the rated voltage, $U_g$ is the root-mean-square (RMS) value of the instantaneous load voltage $u_g$, and n is the reactive power droop coefficient. Combining the reactive power control in equation (13), this provides Q/E droop with voltage regulation. In the steady-state, reactive power output $Q_g$ will track the reference $Q^*_g$ through the reactive power control (13) according to equation (16):

$$Q_g = Q^*_g = \frac{E^* - U_g}{n} \qquad (16)$$

Then $nQ_g$ in the PV system 400 can be equal to those in other parallel units, because both E* and $U_g$ are the same for all parallel-operated units. This guarantees accurate reactive power sharing of the PV system 400 with other parallel units.

Mode detection 470 is a critically important aspect of the embodiments disclosed herein. When the microgrid is disconnected from the utility grid, a mode detection unit needs to trigger the islanded mode operation of the PV system 400 with droop control.

There are two kinds of islanded detection methods: passive techniques and active techniques. Passive techniques are generally based on monitoring and processing local signals (e.g., grid voltage, output current, or grid frequency).

In certain embodiments, passive methods include detections of over-/under-voltage, detections of over-/under-frequency, detections of voltage/current harmonics, and state estimations. The active techniques usually introduce some disturbances to the system output intentionally and analyze the behaviors of the system responses to these disturbances to determine the system's operational conditions. In other embodiments, major active methods include harmonics injection/detection of impedance, variation of real power and reactive power, etc. As a general rule, active islanded detection techniques are more accurate than passive techniques, but also more complex. Active methods also introduce harmonics into the grid system. In certain embodiments mode change also can be triggered by external signals with other requirements, e.g., from a microgrid centralized controller (MGCC).

Figure 9:
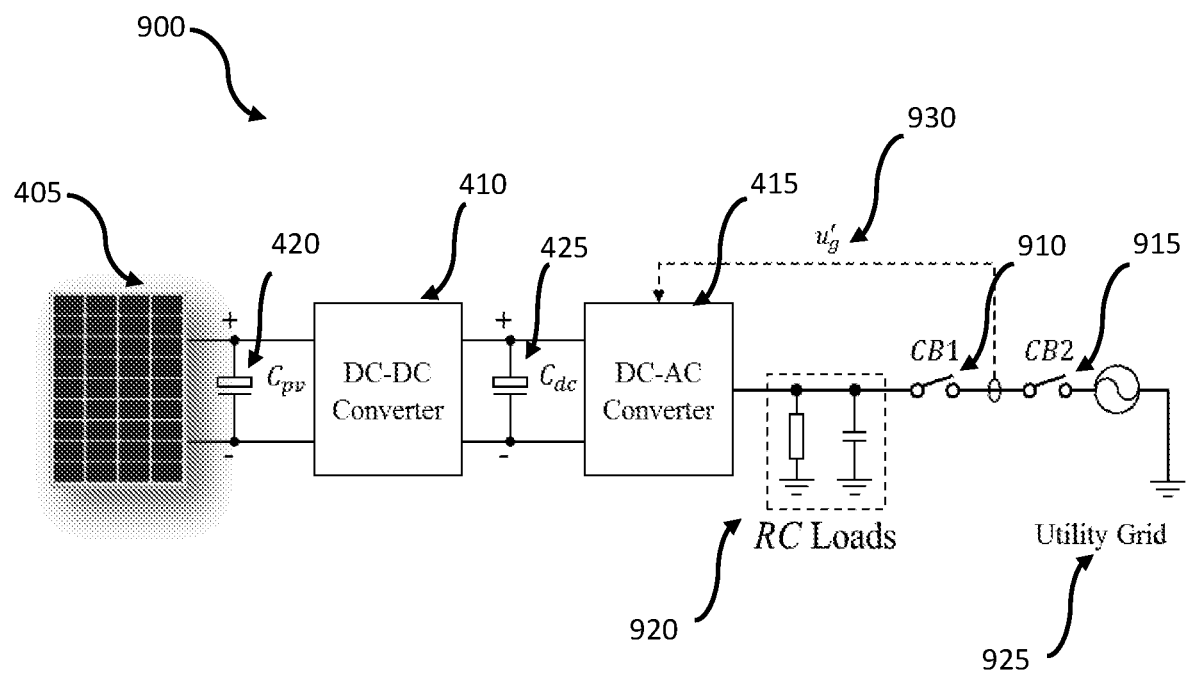
FIG. 9 depicts an exemplary unified control system, in accordance with the disclosed embodiments.

An exemplary unified control system 900 for seamless mode change includes a PV system with both grid-connected mode and islanded mode, as shown in FIG. 9. The system 900 was used to test the embodiments disclosed herein, where the PV system 900 with some local RC loads 920 are connected with the utility grid 925 through a circuit breaker CB1 910. The solar sources 405 are designed with the 10×10 series-parallel arrays of RENOGY RNG-50P. RC loads 920 can comprise 14.4Ω resistance and 80 μF capacitance. The utility grid 925 can comprise a three-phase AC grid with rated phase-voltage amplitude of 120 $V_{rms}$ and rated frequency of 60 Hz. When both CB1 910 and circuit breaker CB2 915 are ON, the PV system 900 operates at grid-connected mode. When CB2 915 is turned OFF, the PV system 900 operates at islanded mode. An additional grid voltage measurement $\dot{u}_g$ 930 is conducted by the DC-AC converter 415 for initial synchronization, when the PV system 900 switches from islanded mode to grid-connected mode. System parameters associated with this configuration are provided in Table 2, and control parameters are given in Table 3. The solar sources 405 are assumed to work at a standard test environment.

TABLE 2

System Parameters

| Parameters | Values | Parameters | Values |
|---|---|---|---|
| $C_{pv}$ | 1000 μF | $L_g$ | 2.2 mH |
| L | 100 μH | $R_g$ | 0.5 Ω |
| $R_L$ | 0.1 Ω | $C_g$ | 10 μF |
| $C_{dc}$ | 2000 μF | Nominal grid voltage $E^*/\sqrt{3}$ | 120 $V_{rms}$ |
| $V_{dc}^*$ | 400 V | Nominal grid frequency f* | 60 Hz |

TABLE 3

Control Parameters

| Parameters | Values | Parameters | Values |
|---|---|---|---|
| $K_{pdc}$ | 0.08 | $K_{ipv}$ | 100 |
| $k_{idc}$ | 0.2 | $k_p$ | 10 |
| $\Omega_p$ | 10π rad/s | $k_q$ | 2 |
| a | 2 | $G_{pf}(s)$ | $\frac{40\pi}{s+40\pi}$ |
| $k_{es}$ | 0.5 | $G_{qf}(s)$ | $\frac{8\pi}{s+8\pi}$ |
| $\Omega_p$ | 2π rad/s | m | $4\pi * 10^{-5}$ |
| $\Omega_p$ | 5π rad/s | n | $0.002\sqrt{3}$ |
| $K_{ppv}$ | 20 | — | — |

In one case, the system 900 can move from grid-connected mode to islanded mode. The system 900 starts in grid-connected mode with both CB1 910 and CB2 915 ON. Initially, the DC-DC converter 410 regulates the DC-bus voltage. Next, the DC-AC converter 415 synchronizes with the utility grid 925 through the internal circuit breaker CB, shown in FIG. 8, and starts to deliver a small amount of power to the utility grid 925. The MPPT 455 can be enabled at t=1 s. At t=20 s, CB2 915 can be turned OFF to mimic sudden loss of the utility grid 925, then the PV system 900 is forced to operate in islanded mode. Here, a simple mode detection based on the measurement of load voltage $U_g$ can be used. If $U_g$ is out of the range $115\sqrt{3}$ $V_{rms} \leq U_g \leq 125\sqrt{3}$ $V_{rms}$, then islanded mode can be triggered, and CB1 910 is also turned OFF.

The results of this test case are shown in FIGS. 10A-10F. After the system starts, the DC-bus voltage is well regulated to 400 V, as shown in chart 1030 in FIG. 10F. When the MPPT 455 is enabled, the real power output increases gradually to the maximum value at about t=17 s, as shown in chart 1005 in FIG. 10A. The frequency is around the grid frequency of 60 Hz, with some oscillations as shown in chart 1010 in FIG. 10B. These oscillations are caused by the ES-based MPPT 455 due to the oscillations of real power. The oscillations of the frequency decrease gradually, as real power gradually approaches the maximum value. The reactive power output is controlled to 0 Var to maintain the unity power factor, and the load voltage is the same as grid voltage of 120 $V_{rms}$, as shown in chart 1015 FIG. 10C and chart 1020 FIG. 10D, respectively. PV voltage decreases gradually, because more real power is generated from solar panels with the MPPT 455, as shown in chart 1025 in FIG. 10E. At t=20 s, the utility grid 925 is lost. The load voltage surges quickly in FIG. 10D.

Figure 10A:
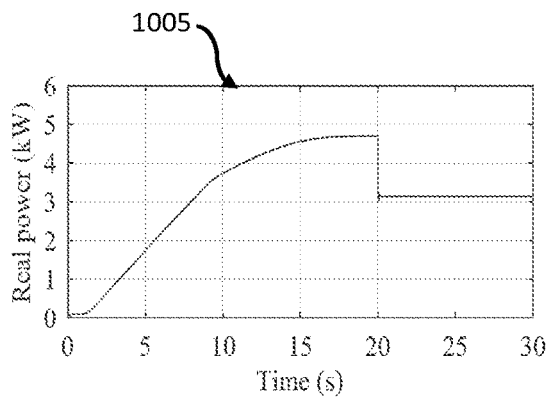
FIG. 10A depicts a chart of exemplary results, in accordance with the disclosed embodiments.
Figure 10B:
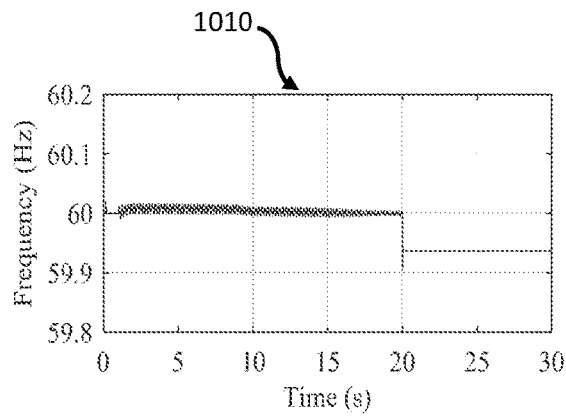
FIG. 10B depicts a chart of exemplary results, in accordance with the disclosed embodiments.
Figure 10C:
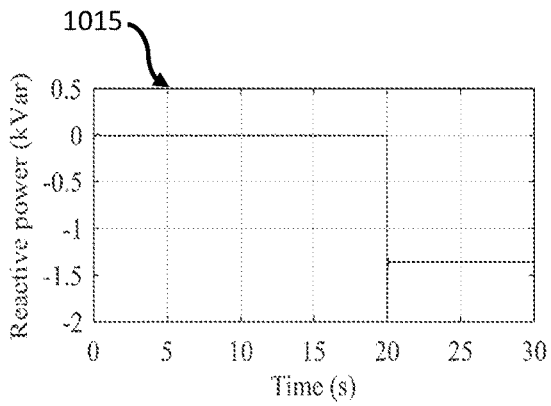
FIG. 10C depicts a chart of exemplary results, in accordance with the disclosed embodiments.
Figure 10D:
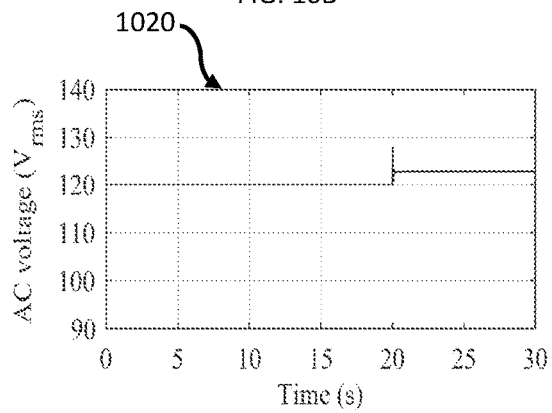
FIG. 10D depicts a chart of exemplary results, in accordance with the disclosed embodiments.
Figure 10E:
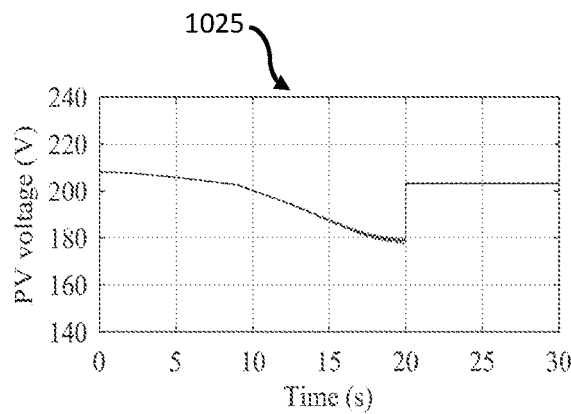
FIG. 10E depicts a chart of exemplary results, in accordance with the disclosed embodiments.
Figure 10F:
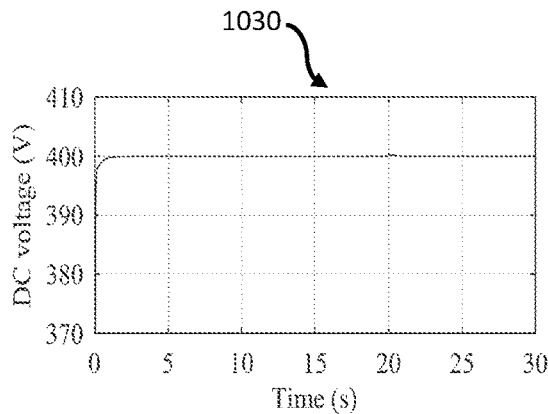
FIG. 10F depicts a chart of exemplary results, in accordance with the disclosed embodiments.
Figure 11A:
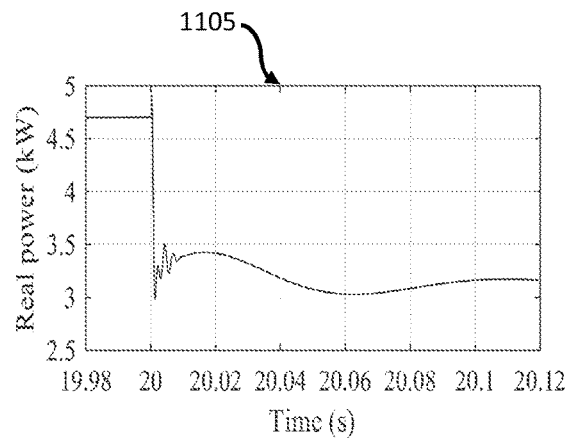
FIG. 11A depicts a chart of transient performances from grid-connected mode to islanded mode, in accordance with the disclosed embodiments.
Figure 11B:
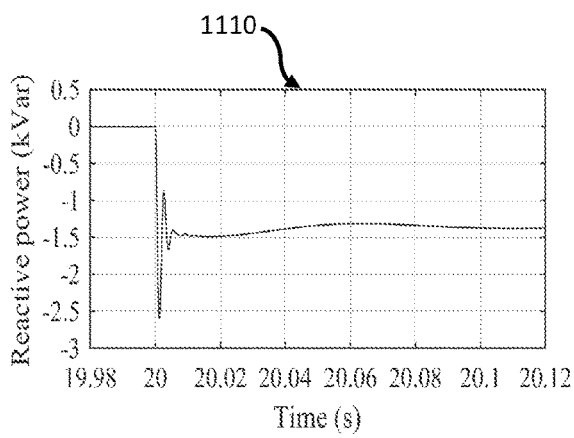
FIG. 11B depicts a chart of transient performances from grid-connected mode to islanded mode, in accordance with the disclosed embodiments.
Figure 11C:
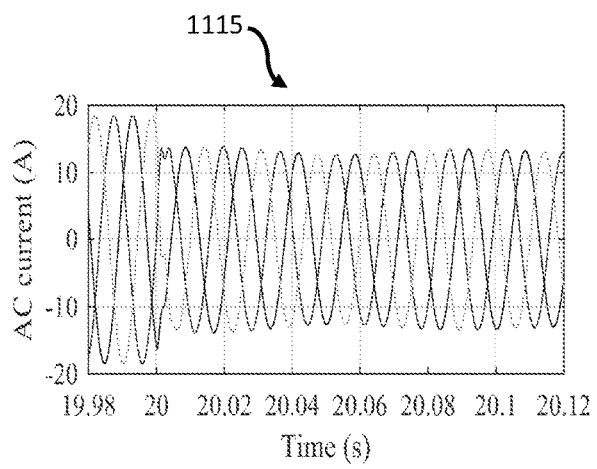
FIG. 11C depicts a chart of transient performances from grid-connected mode to islanded mode, in accordance with the disclosed embodiments.
Figure 11D:
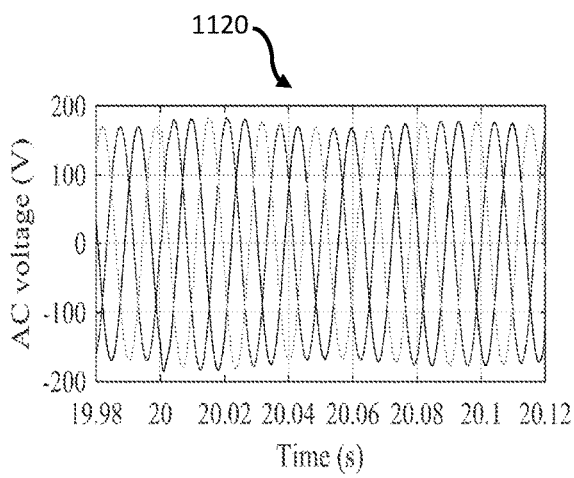
FIG. 11D depicts a chart of transient performances from grid-connected mode to islanded mode, in accordance with the disclosed embodiments.

After the islanded condition is detected, the PV system 900 switches to islanded mode. With several cycles of transient-states, the whole system 900 converges to a steady-state quickly. The frequency is well regulated with P/ω droop control 480, as illustrated in FIG. 10B, and the real power drops to about 3.1 kW as shown in FIG. 10A. The small drop in frequency is caused by positive real power with resistance load. Also, the load voltage is well regulated with Q/E droop control 481 in FIG. 10D, and the reactive power is around −1.4 kVar which supports the capacitance load as shown in FIG. 10C. The small increase in load voltage is caused by negative reactive power. The PV voltage increases to a constant level with less constant real power output of the solar panels as shown in FIG. 10E, and the DC-bus voltage is still well regulated as shown in chart 1030 in FIG. 10F.

The transient performances from grid-connected mode to islanded mode is shown in FIGS. 11A-11D. The AC currents have one-cycle distortions because of the sudden loss of the utility grid, but they converge to smooth curves quickly, as shown in chart 1115 FIG. 11C. The current distortions cause some voltage distortions in chart 1120 in FIG. 11D. The distortions of both currents and voltages also cause the overshoots in both real power and reactive power, but they converge to steady-states soon, as shown in chart 1105 in FIG. 11A and chart 1110 in FIG. 11B, respectively. Therefore, the proposed unified control framework can provide seamless mode change from grid-connected mode to islanded mode.

In another case, the system 900 can move from islanded mode to grid-connected mode. The system starts in islanded mode with CB1 910 in the OFF position and CB2 915 in the OFF position. Initially, the DC-DC converter 410 regulates the DC-bus voltage, then the DC-AC converter 415 starts to deliver power to the RC loads 920 and regulate both frequency and load voltage as well. At t=10 s, CB2 915 can be turned ON, and the PV system 900 starts to synchronize with the utility grid 925 through the measurement of grid voltage $\dot{u}_g$. At t=10.05 s, CB1 910 is turned ON, and the PV system 900 switches to grid-connected mode with both MPPT 455 and power flow control 475 and 476 at t=10.1 s.

Figure 12A:
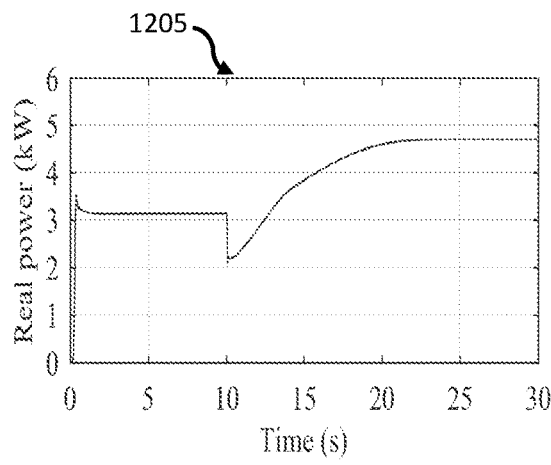
FIG. 12A depicts a chart of exemplary results, in accordance with the disclosed embodiments.
Figure 12B:
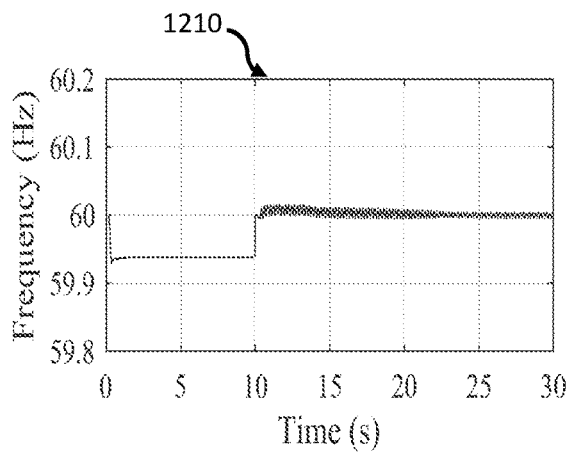
FIG. 12B depicts a chart of exemplary results, in accordance with the disclosed embodiments.
Figure 12C:
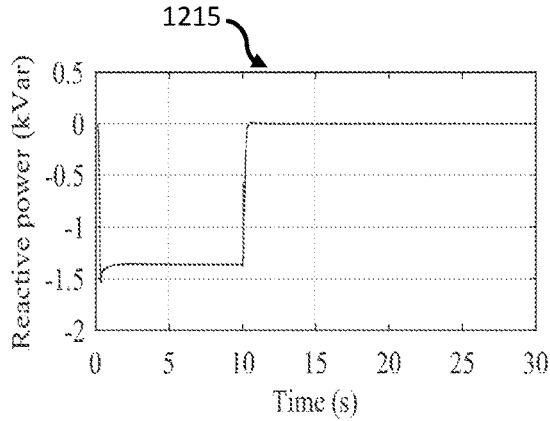
FIG. 12C depicts a chart of exemplary results, in accordance with the disclosed embodiments.
Figure 12D:
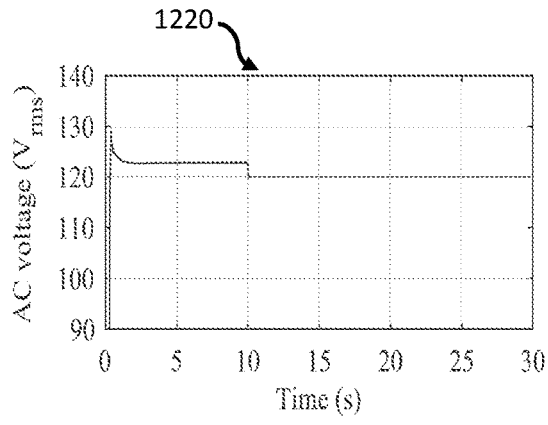
FIG. 12D depicts a chart of exemplary results, in accordance with the disclosed embodiments.
Figure 12E:
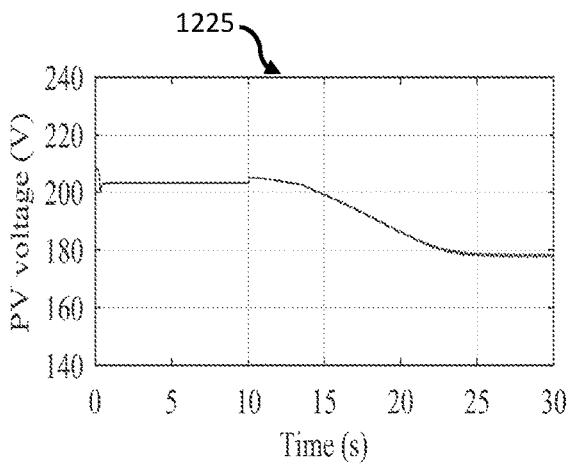
FIG. 12E depicts a chart of exemplary results, in accordance with the disclosed embodiments.
Figure 12F:
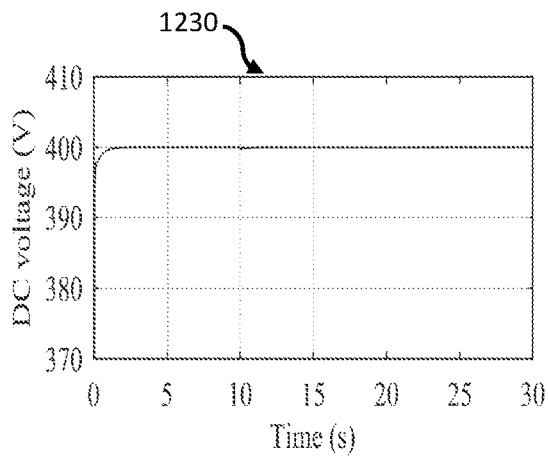
FIG. 12F depicts a chart of exemplary results, in accordance with the disclosed embodiments.
Figure 13A:
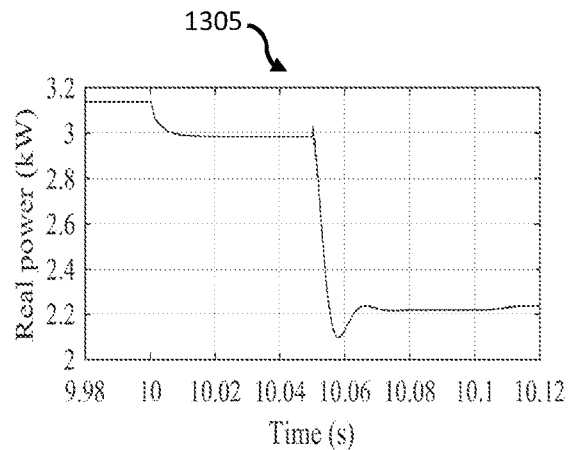
FIG. 13A depicts a chart of transient performances from grid-connected mode to islanded mode, in accordance with the disclosed embodiments.
Figure 13B:
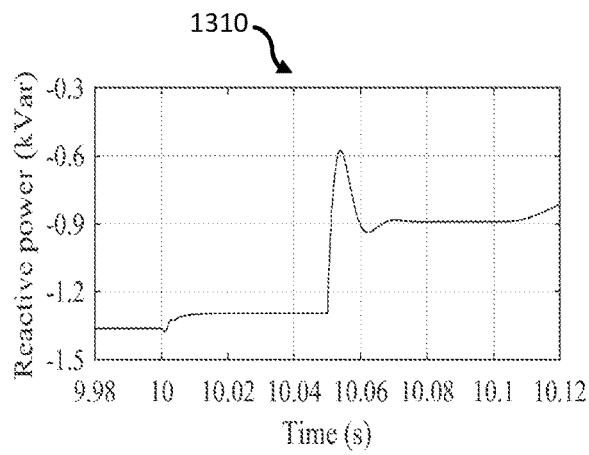
FIG. 13B depicts a chart of transient performances from grid-connected mode to islanded mode, in accordance with the disclosed embodiments.
Figure 13C:
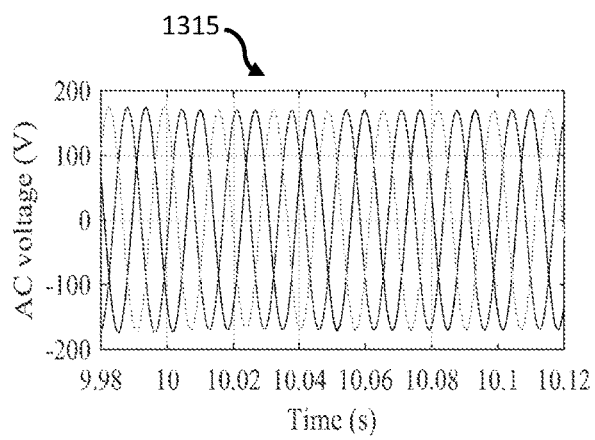
FIG. 13C depicts a chart of transient performances from grid-connected mode to islanded mode, in accordance with the disclosed embodiments.
Figure 13D:
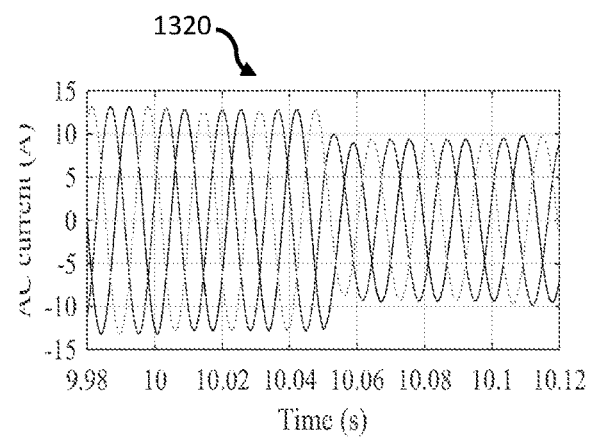
FIG. 13D depicts a chart of transient performances from grid-connected mode to islanded mode, in accordance with the disclosed embodiments.

The results of this test case are illustrated in FIGS. 12A-12F. From chart 1210 in FIG. 12B and chart 1220 in FIG. 12D, it is clear that both frequency and load voltage are well regulated (after some small overshoots) in islanded mode. Both real power in chart 1205 FIG. 12A and reactive power in chart 1215 FIG. 12C converge to steady-states quickly with the droop control 480 and 481. The DC-bus voltage is well regulated as shown in chart 1230 in FIG. 12F, and the PV voltage keeps constant with constant real power output as illustrated in chart 1225 in FIG. 12E. The whole system demonstrates similar steady-state performance to the first case in islanded mode. When CB2 915 is turned ON at t=10 s, with the procedures of the initial synchronization and CB1 910 turned ON, the PV system 900 goes to grid-connected mode with both MPPT 455 and power flow control 475 and 476. The real power drops when CB1 910 is ON, because the utility grid 925 shares some real power to support the loads. Then real power gradually increases to the maximum value with the MPPT 455, as shown in FIG. 12A. The frequency increases to the grid frequency of 60 Hz as illustrated in FIG. 12B, and it has some oscillations with the same reason of the first case. The reactive power in FIG. 12C converges to 0 Var, because $Q_{set}$=0 Var. FIG. 12D shows that the load voltage drops to the grid voltage of 120 $V_{rms}$, because the load is directly connected to the utility grid 925. The PV voltage decreases accordingly because of the MPPT 455 as shown in FIG. 12E, while the DC-bus voltage is still well controlled as shown in FIG. 12F through the DC-bus voltage control 445.

The transient performances from islanded mode to grid-connected mode are shown in FIGS. 13A-13D. After t=10 s, the DC-AC converter 415 of the PV system 900 starts to synchronize with utility grid 925 through $\dot{u}_g$. The real power in chart 1305 FIG. 13A has small drops and reactive power in chart 1310 in FIG. 13B has small increases, because load voltage reduces to grid voltage through grid synchronization. After the initial synchronization and CB1 910 are turned ON at t=10.05 s, there are some transient-states in both real power and reactive power, but they converge to steady-states quickly. After t=10.1 s, real power starts to increase with the MPPT 455, and reactive power starts to converge to 0 Var. There are almost no current distortions and voltage distortions as illustrated by chart 1315 in FIG. 13C and chart 1320 in FIG. 13D. Therefore, the unified control framework can provide seamless mode change from islanded mode to grid-connected mode.

In certain embodiments the methods and systems disclosed herein can be characterized as a control system, comprising a class of grid-integration PV systems and a unified control framework that allows for seamless mode change between grid-connected mode and islanded mode. The grid-integration PV systems can comprise a PV source, a DC-DC converter, and a DC-AC converter with AC grid integration. The unified control framework is configured for seamless mode change between grid-connected mode and islanded mode. The unified control framework can further comprise a DC-DC converter control and a DC-AC converter control.

The control system associated with the DC-DC converter control is configured for controlling the DC-DC converter in the grid-integration PV system. The control system can include a voltage sensor that measures a DC-bus voltage associated with said the grid-integration PV system, a DC-bus voltage control unit that regulates DC-bus voltage and forms a duty-cycle control signal, and a PWM generation unit that generates PWMs for the DC-DC converter from the duty-cycle control signal.

The control system associated with the DC-AC converter control is configured for controlling the DC-AC converter in the grid-integration PV system. The control system can comprise a plurality of sensors that measure a PV output voltage and an AC grid voltage, that outputs the current of the DC-AC converter. A P&Q calculation unit calculates the real power and the reactive power, and a maximum power point tracking (MPPT) unit maximizes the power acquisition of the PV source in grid-connected mode. A real power control unit regulates real power and forms a control signal according to the derivative of power angle in grid-connected mode. A PV voltage regulation unit builds the linkage between the MPPT unit and the real power control unit, and a reactive power control unit regulates reactive power and forms a control signal of the derivative of output voltage. A P/ω droop unit provides frequency regulation for the AC grid and real power sharing in islanded mode and a Q/E droop unit provides voltage regulation for AC grid and reactive power sharing in islanded mode. The mode detection unit detects the operation mode of the AC grid and generates three digital switch signals. The three digital switches switch the mode of grid-integration PV systems. A voltage-forming unit forms a sinusoidal control voltage according to both the derivative of power angle and the derivative of output voltage passing through the integration units and combining with the global settings. Finally, the PWMs generation unit generates PWMs for the DC-AC converter from the sinusoidal control voltage signal.

In certain embodiments, the DC-DC converter control and the DC-AC converter control are decoupled. Thus, the DC-DC converter control is not affected by mode change in the DC-AC converter control. This can facilitate the seamless mode change in the DC-AC converter control.

The unified control system naturally provides the DC-bus voltage protection, even in the fault conditions of the DC/AC converter or AC grid side. Thus, the fault ride-through performance of the system is enhanced by DC-bus voltage protection.

It should be understood that in certain embodiments, the mode detection unit can be replaced by the external trigger signals, e.g., from a microgrid centralized controller (MGCC). The mode change can be triggered by the mode detection unit or can be triggered by the external signals.

Thus, the unified control framework disclosed herein preserves the continuity of control signals in all control units and the unified control framework has a simple structure and procedure for seamless mode change.

Based on the foregoing, it can be appreciated that a number of embodiments, preferred and alternative, are disclosed herein. In an embodiment a control system, comprises a PV system and a unified control framework that provides mode change between a grid-connected mode and an islanded mode.

In an embodiment, the PV system further comprises a PV collector, a DC-DC converter, and a DC-AC converter with an AC grid integration. In an embodiment the unified control framework further comprises a DC-DC converter control and a DC-AC converter control.

In an embodiment the DC-DC converter control further comprises a voltage sensor that measures a DC-bus voltage associated with said PV system, a DC-bus voltage control unit that regulates said DC-bus voltage and forms a duty-cycle control signal, and a PWM generation unit that generates PWMs for said DC-DC converter from said duty-cycle control signal.

In an embodiment the DC-AC converter control further comprises at least one sensor that measures a PV output voltage, at least one sensor that measures an AC grid voltage, and at least one sensor that measures an output current of a DC-AC converter. In an embodiment the DC-AC converter control further comprises a maximum power point tracking (MPPT) unit that maximizes a power acquisition of said PV system in grid-connected mode, a real power control unit that regulates a real power and forms a control signal from a derivative of a power angle in grid-connected mode. a PV voltage regulation unit that provides a linkage between said MPPT unit and said real power control unit, and a reactive power control unit that regulates a reactive power and forms a control signal from a derivative of output voltage. In an embodiment the DC-AC converter control further comprises a P&Q calculation unit that calculates said real power and said reactive power.

In another embodiment the DC-AC converter control further comprises a P/ω droop unit that provides a frequency regulation for an AC grid and real power sharing in islanded mode and a Q/E droop unit that provides a voltage regulation for said AC grid and reactive power sharing in islanded mode. In an embodiment the DC-AC converter control further comprises a mode detection unit that detects an operation mode of an AC grid, three digital switch signals generated by said mode detection unit, and three digital switches configured to switch the mode of said PV system. In an embodiment the DC-AC converter control further comprises a voltage-forming unit that forms a sinusoidal control voltage according to a derivative of power angle and a derivative of output voltage.

In another embodiment, the DC-DC converter control and said DC-AC converter control are decoupled. In an embodiment the unified control framework is configured for natural DC-bus voltage protection, and a fault ride-through performance of said PV system is enhanced by DC-bus voltage protection.

In an embodiment, the mode change is implemented in said DC-AC converter control. In an embodiment, the unified control framework preserves the continuity of control signals in all control units with the configurations of digital switches.

In another embodiment a system, comprises: a DC-DC converter control comprising: a voltage sensor configured to measure a DC-bus voltage associated with an external system, a DC-bus voltage control unit that regulates said DC-bus voltage and forms a duty-cycle control signal; a PWM generation unit that generates PWMs for said DC-DC converter from said duty-cycle control signal; and a DC-AC converter control comprising at least one sensor that measures an output voltage, at least one sensor that measures an AC grid voltage, and at least one sensor that measures an output current of a DC-AC converter.

In an embodiment the DC-AC converter control further comprises a maximum power point tracking (MPPT) unit that maximizes a power acquisition in grid-connected mode, a real power control unit that regulates a real power and forms a control signal from a derivative of a power angle in grid-connected mode a PV voltage regulation unit that provides a link, age between said MPPT unit and said real power control unit, and a reactive power control unit that regulates a reactive power and forms a control signal from a derivative of output voltage.

In another embodiment the DC-AC converter control further comprises a P&Q calculation unit that calculates said real power and said reactive power, a P/ω droop unit that provides a frequency regulation for an AC grid and real power sharing in islanded mode, and a Q/E droop unit that provides a voltage regulation for said AC grid and reactive power sharing in islanded mode. In an embodiment, the DC-AC converter control further comprises three digital switch signals generated by a mode detection unit and three digital switches configured to switch the mode of said PV system.

In another embodiment a control apparatus, comprises a DC-DC converter, a DC-AC converter with an AC grid integration, a voltage sensor that measures a DC-bus voltage associated with said PV system, a DC-bus voltage control unit that regulates said DC-bus voltage and forms a duty-cycle control signal, a PWM generation unit that generates PWMs for said DC-DC converter from said duty-cycle control signal, at least one sensor that measures a PV output voltage, at least one sensor that measures an AC grid voltage, and at least one sensor that measures an output current of a DC-AC converter. In an embodiment, the mode change is implemented in said DC-AC converter control, and preserves the continuity of control signals in all control units with the configurations of digital switches.

It will be appreciated that variations of the above-disclosed and other features and functions, or alternatives thereof, may be desirably combined into many other different systems or applications. Also, it should be understood that various presently unforeseen or unanticipated alternatives, modifications, variations, or improvements therein may be subsequently made by those skilled in the art which are also intended to be encompassed by the following claims.

What is claimed is:

1. A control system, comprising:
   a PV system;
   a unified control framework that provides mode change between a grid-connected mode and an islanded mode;
   a DC-DC converter control; and
   a DC-AC converter control comprising a voltage-forming unit that forms a sinusoidal control voltage according to a derivative of power angle and a derivative of output voltage.

2. The control system of claim 1 wherein said PV system further comprises:
   a PV collector;
   a DC-DC converter; and
   a DC-AC converter with an AC grid integration.

3. The control system of claim 1 wherein said DC-DC converter control further comprises:
   a voltage sensor that measures a DC-bus voltage associated with said PV system;
   a DC-bus voltage control unit that regulates said DC-bus voltage and forms a duty-cycle control signal; and
   a PWM generation unit that generates PWMs for said DC-DC converter from said duty-cycle control signal.

4. The control system of claim 1 wherein said DC-AC converter control further comprises:
   at least one sensor that measures a PV output voltage;
   at least one sensor that measures an AC grid voltage; and
   at least one sensor that measures an output current of a DC-AC converter.

5. The control system of claim 1 wherein said DC-AC converter control further comprises:
   a maximum power point tracking (MPPT) unit that maximizes a power acquisition of said PV system in grid-connected mode;
   a real power control unit that regulates a real power and forms a control signal from a derivative of a power angle in grid-connected mode;
   a PV voltage regulation unit that provides a linkage between said MPPT unit and said real power control unit; and
   a reactive power control unit that regulates a reactive power and forms a control signal from a derivative of output voltage.

6. The control system of claim 5 wherein said DC-AC converter control further comprises:
a P&Q calculation unit that calculates said real power and said reactive power.

7. The control system of claim 1 wherein said DC-AC converter control further comprises:
a P/ω droop unit that provides a frequency regulation for an AC grid and real power sharing in islanded mode; and
a Q/E droop unit that provides a voltage regulation for said AC grid and reactive power sharing in islanded mode.

8. The control system of claim 1 wherein said DC-AC converter control further comprises:
a mode detection unit that detects an operation mode of an AC grid;
three digital switch signals generated by said mode detection unit; and
three digital switches configured to switch the mode of said PV system.

9. The control system of claim 8 wherein said the unified control framework preserves continuity of control signals in all control units with the digital switches.

10. The control system of claim 1 wherein said DC-DC converter control and said DC-AC converter control are decoupled.

11. The control system of claim 1 wherein said unified control framework is configured for natural DC-bus voltage protection, and a fault ride-through performance of said PV system is enhanced by DC-bus voltage protection.

12. The control system of claim 1 wherein said mode change is implemented in said DC-AC converter control.

13. A system, comprising:
a DC-DC converter control comprising:
    a voltage sensor configured to measure a DC-bus voltage associated with an external system;
    a DC-bus voltage control unit that regulates said DC-bus voltage and forms a duty-cycle control signal; and
    a PWM generation unit that generates PWMs for a DC-DC converter from said duty-cycle control signal; and
a DC-AC converter control comprising:
    at least one sensor that measures an output voltage;
    at least one sensor that measures an AC grid voltage; and
    at least one sensor that measures an output current of a DC-AC converter.

14. The system of claim 13 wherein said DC-AC converter control further comprises:
a maximum power point tracking (MPPT) unit that maximizes a power acquisition in grid-connected mode;
a real power control unit that regulates a real power and forms a control signal from a derivative of a power angle in grid-connected mode;
a PV voltage regulation unit that provides a linkage between said MPPT unit and said real power control unit; and
a reactive power control unit that regulates a reactive power and forms a control signal from a derivative of output voltage.

15. The system of claim 13 wherein said DC-AC converter control further comprises:
a P&Q calculation unit that calculates a real power and a reactive power;
a P/ω droop unit that provides a frequency regulation for an AC grid and real power sharing in islanded mode; and
a Q/E droop unit that provides a voltage regulation for said AC grid and reactive power sharing in islanded mode.

16. The system of claim 13 wherein said DC-AC converter control further comprises:
three digital switch signals generated by a mode detection unit; and
three digital switches configured to switch the mode of said PV system.

17. A control apparatus, comprising:
a DC-DC converter;
a DC-AC converter with an AC grid integration;
a voltage sensor that measures a DC-bus voltage associated with a PV system;
a DC-bus voltage control unit that regulates said DC-bus voltage and forms a duty-cycle control signal;
a PWM generation unit that generates PWMs for said DC-DC converter from said duty-cycle control signal;
at least one sensor that measures a PV output voltage;
at least one sensor that measures an AC grid voltage; and
at least one sensor that measures an output current of a DC-AC converter, wherein the mode change is implemented in a DC-AC converter control, and preserves continuity of control signals in all control units with the configurations of digital switches.

* * * * *